A. J. KUSIAN.
AIR AND DUST GUARD FOR LEVER OPENINGS.
APPLICATION FILED JULY 24, 1916.
1,249,122.
Patented Dec. 4, 1917.
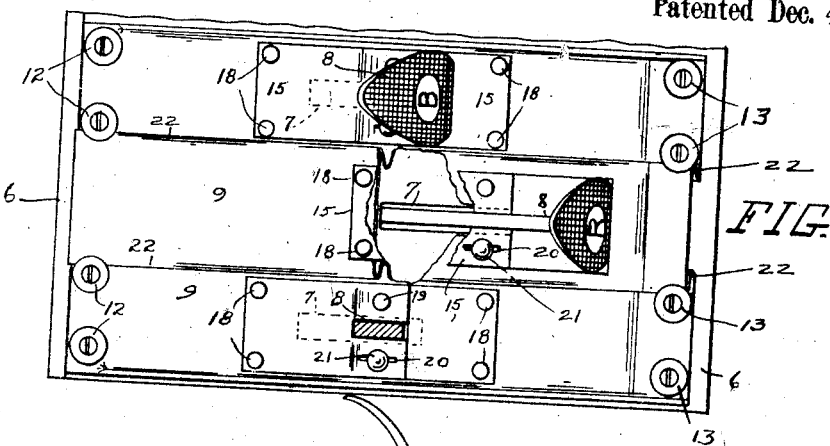
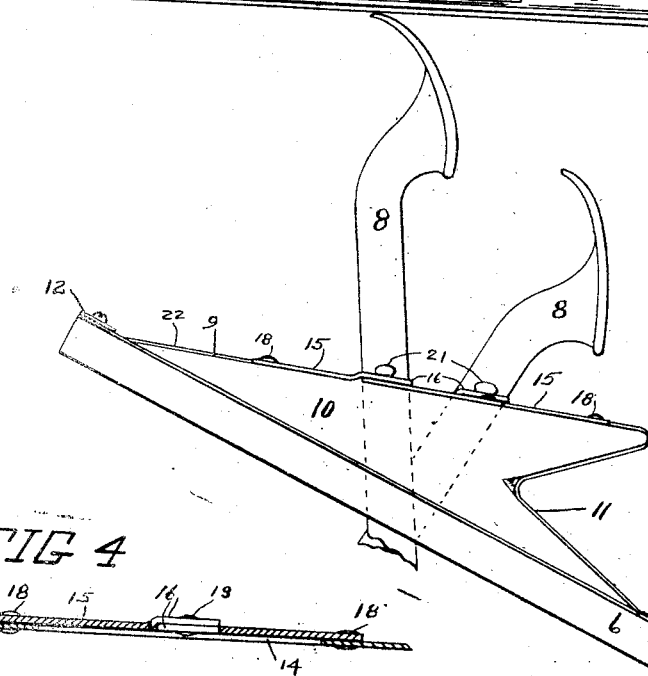
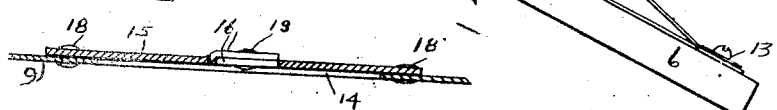
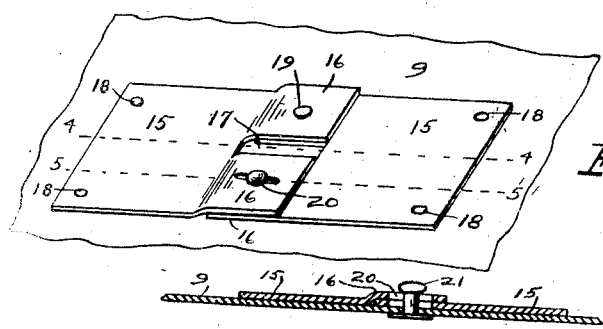
Inventor
A. J. KUSIAN,
Milton S. Crandall,
Attorney

UNITED STATES PATENT OFFICE.

AMANDUS J. KUSIAN, OF MOVILLE, IOWA, ASSIGNOR OF ONE-THIRD TO LEWIS TREELAND, OF MOVILLE, IOWA.

AIR AND DUST GUARD FOR LEVER-OPENINGS.

1,249,122.  Specification of Letters Patent.  Patented Dec. 4, 1917.

Application filed July 24, 1916. Serial No. 110,903.

*To all whom it may concern:*

Be it known that I, AMANDUS J. KUSIAN, a citizen of the United States, and a resident of Moville, in the county of Woodbury and State of Iowa, have invented certain new and useful Improvements in Air and Dust Guards for Lever-Openings, of which the following is a specification.

The present invention relates to means for covering openings through which control members oscillate.

The control levers and pedals of motor-vehicles generally operate through slots in the floor, or foot boards. In warm weather the dust and heat from the engine, and cold air in winter, enter the vehicle through these openings and occasion the passengers much discomfort and annoyance.

The present invention has, therefore, for its primary object, the production of means for closing the pedal and control-lever openings of vehicles.

Another object of the invention is the production of an improved flexible closure for the pedal and control-lever openings of vehicles.

A still further object of the invention is the production of an improved flexible covering for the pedal and control-lever openings of vehicles, inexpensive in construction and embodying certain novel features whereby it can be readily and efficiently installed on that type of motor-vehicle now in most common use.

With these and other objects in view, the invention consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a side elevation of the control pedals and foot board of a Ford automobile, equipped with the preferred embodiment of the invention; Fig. 2 is a plan of the same, the closure and one pedal being cut away; Fig. 3 is an enlarged perspective view of one of the closure flies; Figs. 4 and 5 are longitudinal sections of the same taken on the lines 4—4 and 5—5 respectively.

Although I have illustrated and hereinafter described the preferred embodiment of the invention, I would not be understood as being limited to the specific structure chosen for illustration, for various alterations and modifications may be made in the details of construction and arrangement of parts, without departing from the spirit and scope of the invention as defined in the appended claims.

Referring now to the illustrations, 6, represents the floor board of a Ford automobile provided with slots, 7, through which oscillate the usual control pedals, 8. Upon the foot board I mount a flexible cover which may be of any suitable material as fabric, leather or rubber and including a cover part, 9, side walls, 10, and a rear wall, 11. The front edge of the cover is secured by screws and washers, 12, or otherwise, to the foot board, and the lower edge of the rear wall board, and similarly secured as at, 13. The cover is provided with relatively long slits, 14, (Fig. 4) to admit the shanks of the pedals.

The said slits are covered by flies, preferably each comprising two separate sheets, 15, placed end to end, the adjacent ends of the sheets being provided with ears or flaps, 16, which overlap corresponding ears of the opposite sheet. Between the ears of each sheet is a space, 17, just large enough to receive the shank of the pedal. The remote ends of the sheets are riveted or otherwise fixed to the cover part as at 18, and one pair of the overlapping ears may be permanently secured together as at 19, and the opposite ears are provided with button holes, 20 adapted for engagement with a button or stud 21, secured to the cover part. By unbuttoning the latter ears the sheets may be turned back sufficiently to permit the pedals being introduced through the slits 14. Normally, the flies fit snugly around the pedal cranks and thus close the passage through the slots, 7, and cover slits, 14.

The type of automobiles for which this embodiment is particularly designed is provided with three foot-levers, the center one of which is positioned to the rear of its companions. Therefore, to permit the free operation of the outermost pedals without imparting traction on the center pedal, it follows that there must be some slack in the cover part between the center and the adjacent pedals. This slack may be provided in any suitable manner, as by forming, in the cover, plaits, 22, on each side of the center pedal. As clearly shown in Fig. 1, the rear of the cover is formed with a bellows-like fold, to afford sufficient slack to permit the free operation of the levers.

The device is readily applied to the cars for which it is particularly designed and effectually prevents passage of air and dirt through the pedal slots.

Having thus described the invention, what I claim as new and desire to secure by Letters Patent, is,—

1. A closure for the pedal-lever slots of a vehicle floor-board, comprising a flexible cover adapted to be mounted on the floor-board and apertured to receive the pedal-levers, flies covering the apertures and each including two individual sheets placed end to end, the remote ends being secured to the cover and the adjacent ends being provided with ears adapted to fit adjacent the sides of the pedal-levers.

2. A closure for the pedal-lever slots of a vehicle floor-board, comprising a flexible cover adapted to be mounted on the floor board and apertured to receive the pedal-levers, and flies covering the apertures and each including two individual sheets placed end to end, the remote ends being secured to the cover and the adjacent ends being provided with a pair of ears adapted to fit adjacent the sides of the pedal lever, each ear overlapping the corresponding ear of the other sheet, and two of said overlapping ears being detachably interconnected.

3. A closure for the pedal-lever floor-board slots of a vehicle having three pedal-levers arranged side by side, comprising a flexible covering adapted to be mounted on the floor-board and apertured to receive the pedal-levers, said covering being provided with slack intermediate the center and adjacent pedal-levers to permit individual operation of the pedal levers.

4. A closure for the pedal-lever floor-board slots of a vehicle having three pedal-levers arranged side by side, comprising a flexible covering adapted to be secured at its front edge to the floor-board and including rear and side walls adapted to meet the floor-board, the rear wall being adapted to be secured to the floor-board, said covering being apertured to receive the pedal-levers and provided with forwardly and rearwardly extending plaits intermediate the apertures, and the rear wall being provided with a bellows-like fold to permit operations of the pedal-levers.

In testimony, whereof, I have hereunto set my hand, this 30th day of June, 1916.

AMANDUS J. KUSIAN.